(12) United States Patent
Hassanali Issa Hacamo

(10) Patent No.: US 12,256,853 B2
(45) Date of Patent: Mar. 25, 2025

(54) FRAME

(71) Applicant: Rafik Business & Investments Unip. LDA., Lisbon (PT)

(72) Inventor: Rafik Hassanali Issa Hacamo, Lisbon (PT)

(73) Assignee: Rafik Business & Investments Unip. LDA., Lisbon (PT)

( * ) Notice: Subject to any disclaimer, the term of this patent is extended or adjusted under 35 U.S.C. 154(b) by 0 days.

(21) Appl. No.: 17/424,026

(22) PCT Filed: Jan. 18, 2019

(86) PCT No.: PCT/PT2019/050001
§ 371 (c)(1),
(2) Date: Jul. 19, 2021

(87) PCT Pub. No.: WO2020/149753
PCT Pub. Date: Jul. 23, 2020

(65) Prior Publication Data
US 2022/0125222 A1    Apr. 28, 2022

(51) Int. Cl.
*A47G 1/06* (2006.01)
*A47G 1/16* (2006.01)
*G09B 21/00* (2006.01)

(52) U.S. Cl.
CPC .......... *A47G 1/0638* (2013.01); *A47G 1/162* (2013.01); *A47G 2001/0672* (2013.01); *G09B 21/003* (2013.01)

(58) Field of Classification Search
CPC ............... A47G 1/0638; A47G 1/162; A47G 2001/0672; A47G 1/17; A47G 2001/0677;
(Continued)

(56) References Cited

U.S. PATENT DOCUMENTS 3,553,872 A * 1/1971 Ebner ............... G09F 1/12
40/721
3,965,599 A * 6/1976 Ebner ............... G09F 7/04
40/711
(Continued)

FOREIGN PATENT DOCUMENTS

DE    202010015323 U1 * 3/2011 ............ A47G 1/06
DE    202015006319 U1    10/2015
(Continued)

OTHER PUBLICATIONS

International Search Report of PCT/PT2019/050001 Mailed on Sep. 30, 2019.

*Primary Examiner* — Cassandra Davis
(74) *Attorney, Agent, or Firm* — Rivka Friedman

(57) ABSTRACT

The present invention falls within the scope of frames, in particular a frame with magnetic and printing technology. It is an object of the present invention to provide a frame on which various types of printing can be performed and which is provided with a magnetic fastening system comprised of at least two rigid parts of different dimensions and thicknesses, these being a base (1) and at least one front panel (2) on which a printing can be made and/or to which decorative elements can be attached, the front panel (2) being fixed to the base (1) by magnetic fastening means (3). The presence of magnetic fastening means (3) in the base (1) and in the front panel (2) enables simple fixing and detachment between both, allowing the front panel (2) to be replaced several times in a quick and easy manner. In addition, the present invention comprises, both at the base (1) and the front panel (2), fixing means (5) to a vertical surface.

8 Claims, 2 Drawing Sheets

(58) Field of Classification Search
CPC ............... G09B 21/003; G09B 21/00; G09F 2007/1852; G09F 1/12
See application file for complete search history.

(56) References Cited

U.S. PATENT DOCUMENTS

| | | | |
|---|---|---|---|
| 5,131,659 A * | 7/1992 | Lindberg, Jr. | A63B 24/0003 359/838 |
| 7,097,144 B2 * | 8/2006 | Kohno | A47G 25/0607 248/683 |
| 7,219,460 B1 | 5/2007 | Grayson | |
| 9,440,597 B1 * | 9/2016 | Broadwell | B60R 13/105 |
| 2005/0193614 A1 | 9/2005 | Conrad | |
| 2008/0229639 A1 * | 9/2008 | Barkley | A47G 1/0633 40/711 |
| 2013/0160338 A1 * | 6/2013 | Forbis | A47G 1/06 40/711 |
| 2015/0089851 A1 * | 4/2015 | Minguez | G09F 1/08 40/594 |
| 2016/0073796 A1 * | 3/2016 | Nesbitt | G09F 7/04 40/711 |

FOREIGN PATENT DOCUMENTS

| | | | |
|---|---|---|---|
| EP | 2377435 A1 | | 10/2011 |
| KR | 20180130848 A | * | 12/2018 |

* cited by examiner

FRAME

SCOPE AND BACKGROUND OF THE INVENTION

The present invention is falls within the scope of frames, namely a frame on which various types of printing can be performed and which is provided with a magnetic fastening system.

It is an object of the present invention to provide a frame comprising at least two rigid parts of different dimensions and thicknesses, these being a base (1) and at least one front panel (2) on which an image can be printed, the front panel (2) being attached to the base (1) by magnetic fastening means (3) existing on both parts.

The direct printing on the front panel (2) enables it to be easily and rapidly replaced multiple times by other front panels (2) with different types of prints and/or decorative elements according to the user's desires or needs.

The market offers some solutions of frames with elements or magnetic strips that allow the attachment of a front element and a rear element, with the image, photography, printing, or the work to be displayed, being arranged between the two parts; however, these types of solutions have an ephemeral character in as much as the work between the two elements will easily be discarded by another one, because it is usually printed on printing paper or photographic paper, which after being replaced by another can easily deteriorate over time or even go astray.

On the other hand, these already existing solutions imply removing the frame from the system of attachment to the wall or from a holder, then removing the front element and put the work looking properly centred on the back. Depending on the user's skill and/or the weight of the print, sometimes it is not easy to position it properly at the centre as it may sag or simply not become centred at the first attempt.

The present invention finds its closest background in the U.S. Patent Application with Publication No. US20070193096, which discloses a frame with a front part and a rear part, provided with a magnetic attachment and detachment system, differing from the present invention in that the front part is transparent, so that the work remaining between these two parts can be observed, and is therefore different from this invention. This type of solution disclosed in the aforementioned patent application is an alternative to the hook attachment systems of the rear element to the transparent front element.

The present invention is clearly distinct in that the front element is not transparent, this being the display of the image or work. Once the printing is performed directly on the front part, in this case and as already mentioned, the front panel (2), which is rigid and of a significant thickness, is more likely to be reused after a replacement as it is not easily deteriorated over time, and so it will not be discarded given the more durable and resistant character of the object.

On the other hand, the fact that there is no material between the two rigid elements ensures a more effective and lasting adhesion between the two parts, in addition to the evident ease of replacing one panel with another, by simply detaching the magnetic fastening means (3) between the parts and placing the new panel with the new print to be displayed, without the user being concerned with positioning the image right at the centre.

In addition to the possibility of being used in a family or business environment, the fact that they can be used in places attended by a diverse public with a frequent update of the communication, or in training and/or academic environment, is also a great advantage.

Braille printing on the front panel (2) will allow blind people to read or perceive the message to be conveyed, for example in the case of an exhibition, a museum or even in a training environment. The same applies to communication through augmented language, which will also make it possible to be read by those with impaired vision, such as the elders or people with severe vision problems, as well as pictogram printing thus enabling the interpretation of content through an universal language, that will cover both illiterate and/or poorly literate public and people from different nationalities.

In short, this invention has the following advantages comparatively to the prior art:

- easy and quick replacement of the front panel (2) according to the user's desire and/or need;
- greater durability and resistance;
- immediately centred image;
- saving paper, avoiding printing on it;
- the possibility of attaching it to the wall or placing it on a frame holder;
- pedagogical and formative, in as much as it is possible to update instructions or information;
- relief printing, Braille printing, augmented language printing or pictogram printing are all made possible.

SUMMARY OF THE INVENTION

It is thus the object of the present invention a frame on which various types of printing can be made and which is provided with a magnetic fastening system comprised of at least two rigid parts, of different dimensions and thicknesses, these being a base (1) and at least one front panel (2) on which an image or a form of communication is printed, the front panel (2) being attached to the base (1) by magnetic fastening means (3) in both parts.

Therefore, the present invention relates to a frame whose front panel (2) can be made up of various types of materials such as acrylic, PVC, wood, among others, as long as they allow a direct printing on it, as well as its direct attachment to the base (1) through magnetic fastening means (3) embedded in both the base (1) and the back surface of the front panel (2).

The direct printing on the front panel (2) enables it to be easily and quickly replaced multiple times by other front panels (2) with several types of different prints and/or decorative elements according to the user's desire or need.

DETAILED DESCRIPTION OF THE INVENTION

Figure 1:
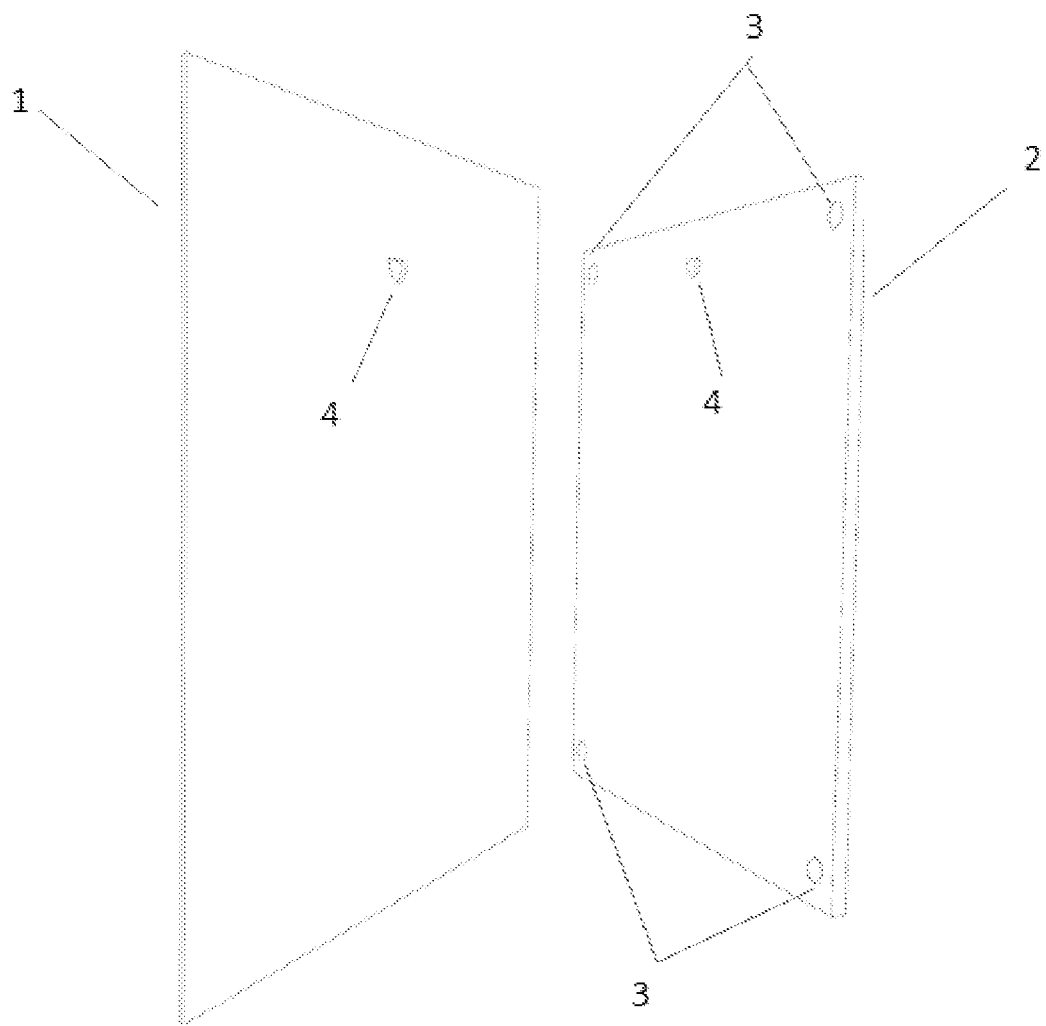
FIG. 1—is a perspective view of the frame parts comprised of the base (1) and the front panel (2) which is fixed directly on the base (1) by magnets (3) embedded in the front panel (2).

The frame, object of the present invention, is comprised of at least two rigid parts of different dimensions and thicknesses between them, these being:
- a base (1); and
- a front panel (2) on which direct printing is made and/or to which decorative elements are fixed;

the base (1) and the front panel (2) being attached in direct contact with one another by magnetic fastening means located on the base (1) and on the front panel (2).

In addition, both the base (1) and the front panel (2) have on the rear surface fastening means (4) for fixing the base (1) and the front panel (2) simultaneously to a vertical surface.

In a preferred embodiment of the invention, the fastening means (4) to a vertical surface in the base (1) are perforations and the fastening means (4) of the front panel (2) are perforations or recesses (4) that do not exceed the thickness of the front panel (1).

It is now important to detail how the magnetic fastening means (3) are mounted to the base (1) and to the front panel (2), the said means being magnets (3).

The rear surface of the base (1) and the front panel (2) have perforations with the same dimensions and thicknesses of the magnets (3), these perforations not running through the full thickness of the base (1) and front panel (2). In this way, the magnets (3) are subsequently engaged and glued in the said perforations, being exposed only superficially on the back surfaces and concealed on the front surfaces of the base (1) and front panel (2).

This perforation for fitting the magnet (3), which is only accessible at the back, provides a specific larger surface for the bonding, ensuring a better fit and fixing of the magnet (3) to the part, preventing them from being visible on the front surface of the base (1) and of the front panel (2). Furthermore, the fact that the magnets (3) are arranged on the surface and not glued over it ensures a longer-lasting solution, avoiding premature detachments due to lack of adhesion to the support or accidental strokes on the magnets (3), thus resulting in a more perfect finishing.

Therefore, the present invention consists of a frame comprised of a base (1) and at least one front panel (2) on which a printing is directly performed, the front panel (2) being of sufficient thickness to accommodate a magnet (3) which is embedded in its rear surface, and in turn that same front panel (1) is secured to the base (1) by magnetic pull.

The frame may have at least one magnet (3) in the base (1) and at least one magnet (3) in the front panel (2) which secure the front panel (1) to the base (1).

The fact that there is no material between the two rigid elements, i.e. the surfaces of the base (1) and the front panel (2) have a direct contact as claimed, promotes a more effective and longer-lasting adhesion between the two parts, enabling the use of a front panel (2) of greater weight and thickness, thus causing this solution to be more versatile. In addition, it is easy to replace one front panel (2) with another, by simply loosening the magnetic fastening means (3) between the parts and replacing the new front panel (2) with the new print to be displayed, without the user being concerned with centering the image.

On the other hand, this direct printing of an image or communication on the front panel (1), without that same image or message being coated by a transparent material or even a glass, enables relief printing given the thickness of the front panel (2) as well as fastening of decorative elements. In the present invention, since the image is exposed to the user and provides relief printing, Braille language can be printed and the front panel (2) replaced whenever necessary.

It should also be noted that the base (1) and the front panel (2) are similar in shape and size, and are preferably concentric in order to ensure the framing effect provided by the attachment of the front panel (2) to the base (1), the said base (1) preferably having larger dimensions than the front panel (1).

On the other hand, both parts i.e. the base (1) and the panel (2) can be printed. Since the dimensions of the base (1) are preferably greater than those of the front panel (2), it can also be printed by providing a frame with various patterns, colours or any other image.

The present invention, in addition to ensuring a quick and easy replacement of a front panel (2) with another one, enables printing on a plurality of materials such as wood, PVC, acrylic, laminated panel and ceramics among other materials, provided that they are printable.

The frame, object of the present invention, may be rectangular, square, circular, triangular or of any other shape.

Figure 2:
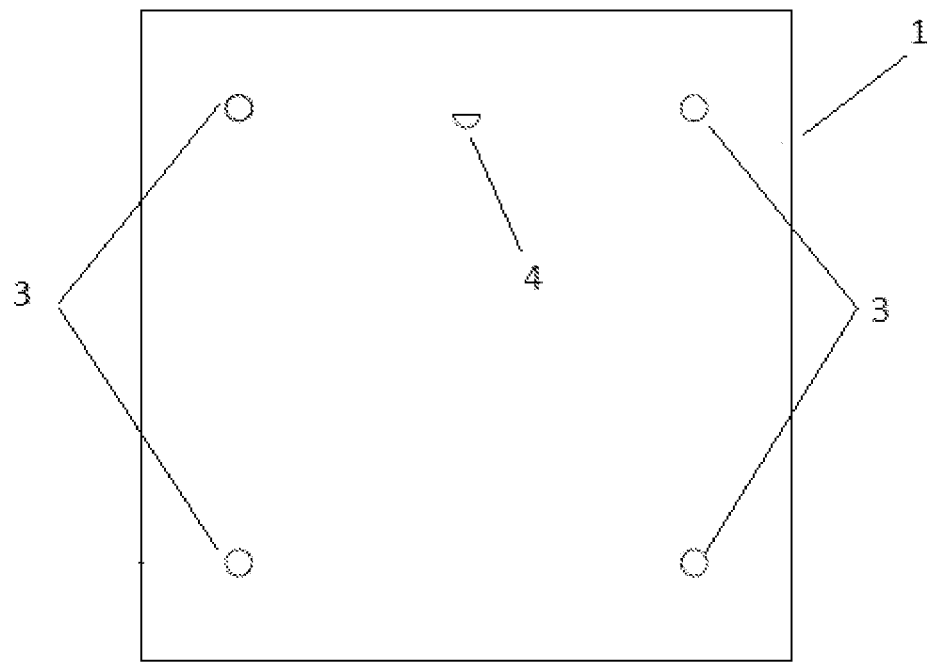
FIG. 2—is an illustration of an embodiment of the frame, in which a front view of the rear surface of the front panel (2) is depicted with a square shape, wherein four magnets (3) are embedded at the ends and which has a perforation (4) for attachment to the wall.
Figure 3:
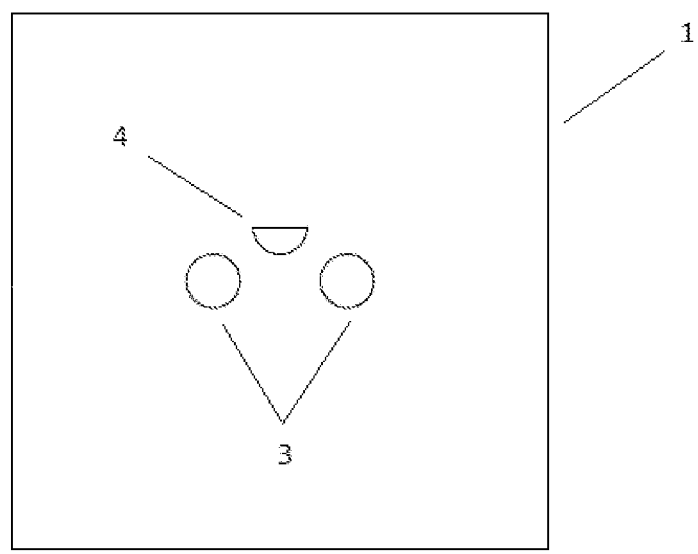
FIG. 3—shows a front view of the rear surface of the front panel (2) with a square shape, wherein two magnets (3) are centrally embedded and which has a perforation (4) for attachment to the wall.

Depending on the dimensions of the frame, it may have as many magnets (3) as necessary for attaching the front panel (2) to the base (1). The magnets (3) may be distributed at the ends of the base (1) and front panel (2) (FIG. 2) or distributed at the centre (FIG. 3).

The shape and dimensions of the frame may be variable as long as the dimensions and weight of the front panel (2) do not exceed the dimensions and weight of the base (1) and provided that the magnets (3) placed in both the rigid parts cooperate with each other in order to secure the front panel (2) to the base (1).

The present invention can either be fixed to the wall, through the fastening means (4) located on the base (1) and on the front panel (2), or placed on a horizontal surface.

As will be evident to a person skilled in the art, the present invention should not be limited to the embodiments described herein, and a number of changes are possible which remain within the scope of this invention.

Of course, the preferred embodiments above described are combinable in the different possible forms, the repetition of all such combinations being herein avoided.

The invention claimed is:
1. A frame comprising:
a) a base; and
b) at least one front panel, the at least one front panel being a printable medium and having a direct printing thereon;
the base and the at least one front panel being fixed in direct contact with one another through magnets, wherein the magnets are located on a rear surface of the base and on a rear surface of the at least one front panel, both the rear surface of the base and the rear surface of the at least one front panel having perforations where the magnets are engaged and glued in the perforations, the perforations with the same dimensions and thicknesses of the magnets, the perforations not running through the full thickness of the base and the at least one front panel, wherein on the rear surface of the base and on the rear surface of the at least one front panel there are fastening means for fixing the base and the at least one front panel simultaneously to a vertical surface.

2. The frame according to claim 1 wherein the printing is relief printing.

3. The frame according to claim 1 wherein the magnets are distributed at ends of the base and at ends of the at least one front panel.

4. The frame according to claim 1 wherein the magnets are distributed at a centre of the base and at a centre of the at least one front panel.

5. The frame according to claim 1 wherein the fastening means on the base are perforations.

6. The frame according to claim 1 wherein the fastening means on the at least one front panel are perforations or recesses that do not exceed the thickness of the at least one front panel.

7. The frame according to claim 1 wherein the base and the at least one front panel are concentric in shape, the base having larger dimensions than the at least one front panel.

8. The frame according to claim 1 wherein the base and the at least one front panel are made from wood, PVC, acrylic, laminated panel, or ceramics.

* * * * *